Jan. 5, 1960     C. L. HORN     2,919,918

HEAD STAND

Filed Nov. 25, 1957

INVENTOR
C. L. HORN.

BY *Robert L. Dunn*

ATTORNEY

United States Patent Office 2,919,918
Patented Jan. 5, 1960

2,919,918

HEAD STAND

Clarence Leonard Horn, Palo Alto, Calif.

Application November 25, 1957, Serial No. 698,798

6 Claims. (Cl. 272—60)

This invention relates to physiotherapy and deals with an appliance used by a person to stand on his head.

Although the invention has been designed and is directed toward its usefulness in the cult of Yoga, it will become apparent that it will also find usefulness in physiotherapy and gymnasium work.

The primary object of this invention is to provide a head stand having adjustments that make it adaptable to persons of different sizes.

Another object is to provide a head stand of durable, light construction and one having all the equipment necessary to provide a comfortable useful stand with a neat workmanlike appearance.

Other objects and advantages will appear as the description proceeds in conjunction with the drawing in which.

Figure 1:
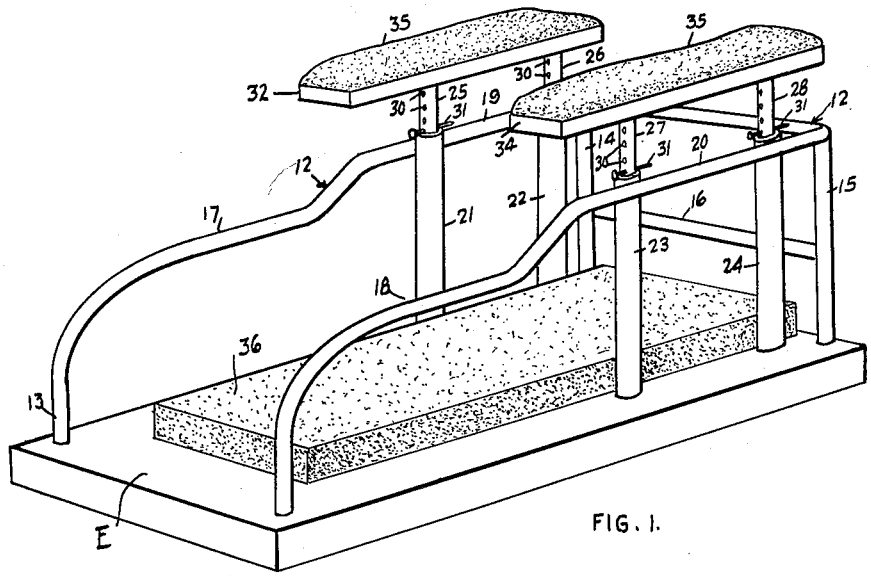
Fig. 1 is a perspective view showing the apparatus as it appears ready for use.

Referring to the drawing, it can be seen in Fig. 1 that my apparatus in its preferred form consists of a base 11 of suitable material such as wood, metal or plastic. A guard rail of pipe, or its equivalent, generally designated 12, surrounds three sides of the base leaving an open end E as seen in this view. The guard rail consists of a single run of pipe, or joined sections of pipe if preferred, which is mounted on the base as follows: Starting at point 13, one end of the pipe is inserted into the base 11, similar to the construction shown in Fig. 3. It then follows around the shape of the base to the opposite side of the open end E where the other end of the pipe is similarly mounted in the base. The rear end of the pipe is carried on a pair of upright members 14 and 15 which are also inserted into the base for support. A cross member 16 may be run between the two members 14 and 15 if desired or found necessary for strength or rigidity. It will be noted that the guard rail 12 is formed with the forward part of the rail lower than the rear part. For instance, the sections 17 and 18 are lower than the sections 19 and 20 respectively. While this makes for better construction both with respect to appearance and strength, it is not an essential part of the invention.

Figure 3:
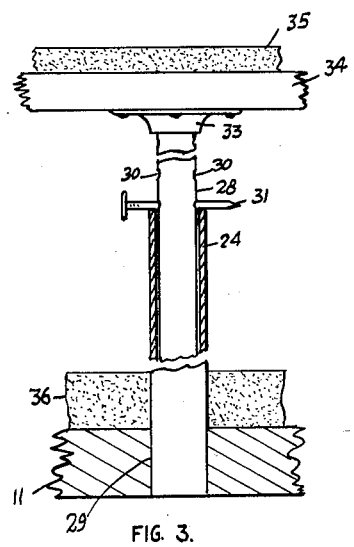
Fig. 3 is a fragmentary, enlarged view showing the construction for adjusting the heighth of the shoulder supports.

In the elevated section of the guard rail, I incorporate a pair of shoulder rests with means for adjusting the heighth of these rests to accommodate the head stand to people of different heighths and sizes. Here it will be observed are four upright pipes 21, 22, 23, and 24. These pipes are all inserted into tight fitting holes 29 in the base 11, as shown in Fig. 3. The upper ends of these pipes are secured to the rail 12 in any suitable manner such as by welding. Inside each pipe is a smaller pipe slidable therein which are shown as 25, 26, 27 and 28 respectively. Each of these pipes is provided with a series of holes 30 adapted to receive nails 31 that extend thru the pipe and rest on the top of the larger pipe. The series of holes provides for different elevations of the smaller pipe with respect to the base. On top of the smaller pipes 25 and 26 I mount a shoulder supporting member 32 in any suitable manner, such as by flanges 33, see Fig. 3. On the opposite side of the guard rail I mount a similar member 34 on pipes 27 and 28 and on both members 33 and 34 I provide pads 35 of a suitable substance such as sponge rubber or the like.

On the base 11 inside the guard rail 12, I mount another pad 36 of similar material. These pads may be demountable for convenience if desired.

Figure 2:
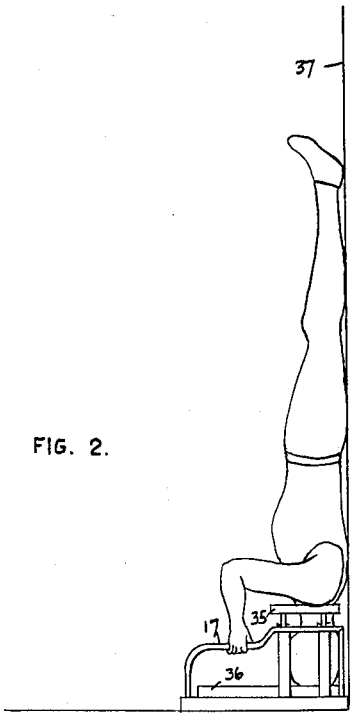
Fig. 2 shows the apparatus in use.

In Fig. 2, I have shown a person making a head stand on my new apparatus. It will be seen that the apparatus is backed up against a wall 37 and that the shoulder rests have been adjusted until the man's head rests upon the pad 36 while his shoulders rest on the pads 35. Also that his hands normally are in a position to grasp the lower runs 17 and 18 of the guard rail and support himself in this position.

A piece of equipment of the above described character not only supplies the necessary support for head standing but is light, compact, small and of good workmanlike appearance for use in homes, offices or gymnasiums.

I claim:

1. In a head stand, a base, an elevated guard rail mounted on said base, shoulder supports extending above said guard rail, and means for adjusting the heighth of said supports relative to said base.

2. In a head stand, a base, an elevated guard rail mounted on said base, a section of said guard rail being arranged to provide a hand gripping position for a person using said stand, shoulder supports extending above said guard rail, and means for adjusting the heighth of said supports relative to said base.

3. A head stand comprising an elongated base, a cushion on said base for supporting the head of a person using said head stand, padded supports on opposite sides of said base adapted to engage and support the shoulders of said person, and hand rails on said opposite sides of said base arranged to be grasped by the hands of the above mentioned person.

4. The elements of claim 3 and in addition thereto, means for raising and lowering said padded supports relative to said base.

5. A head stand comprising an elongated base, an elongated cushion on said base for supporting the head of a person using said head stand, upright standards on opposite sides of said base, a padded member adapted to receive and support the shoulders of said person mounted on said upright standards on each side of said base and hand rails extending from said upright standards arranged to be grasped by the hands of said person.

6. The elements of claim 5 and in addition thereto means for adjusting the height of said padded members relative to said base and said hand rails.

References Cited in the file of this patent

UNITED STATES PATENTS

| 1,111,268 | Medart | Sept. 22, 1914 |
| 1,510,585 | Cushing | Oct. 7, 1924 |
| 2,405,024 | Eynon | July 30, 1946 |
| 2,632,645 | Barkschart | Mar. 24, 1953 |
| 2,666,640 | Jennings | Jan. 19, 1954 |

FOREIGN PATENTS

| 287,392 | Germany | Sept. 21, 1915 |